United States Patent
Mohri

(10) Patent No.: US 7,634,408 B1
(45) Date of Patent: *Dec. 15, 2009

(54) SYSTEM AND METHOD OF EPSILON REMOVAL OF WEIGHTED AUTOMATA AND TRANSDUCERS

(75) Inventor: Mehryar Mohri, New York, NY (US)

(73) Assignee: AT&T Intellectual Property II, L.P., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/110,920

(22) Filed: Apr. 28, 2008

Related U.S. Application Data

(63) Continuation of application No. 11/214,254, filed on Aug. 29, 2005, now Pat. No. 7,383,185, which is a continuation of application No. 09/910,090, filed on Jul. 20, 2001, now Pat. No. 7,027,988.

(51) Int. Cl.
*G10L 15/00* (2006.01)
*G10L 13/00* (2006.01)
*G06F 17/21* (2006.01)

(52) U.S. Cl. .................. 704/251; 704/9; 704/257; 704/258; 704/1

(58) Field of Classification Search ........... 704/257, 704/255, 251, 256, 1, 9, 10
See application file for complete search history.

(56) References Cited

U.S. PATENT DOCUMENTS

| 5,095,432 | A | * | 3/1992 | Reed | .......... 704/9 |
|---|---|---|---|---|---|
| 5,806,032 | A | | 9/1998 | Sproat | |
| 6,032,111 | A | | 2/2000 | Mohri | |
| 6,073,098 | A | | 6/2000 | Buchsbaum et al. | |
| 6,499,132 | B1 | | 12/2002 | Morley et al. | |
| 6,574,597 | B1 | | 6/2003 | Mohri et al. | |
| 6,760,636 | B2 | | 7/2004 | Kempe | |

OTHER PUBLICATIONS

Weng, F.L, Stolcke, a., and Sankar, A. (1998), Efficient Lattice Representation and Generation. In the Proceedings of International Conference on Spoken Language Processing, Sydney, Australia, Nov. 30-Dec. 4, 1998.

(Continued)

*Primary Examiner*—James S Wozniak

(57) ABSTRACT

An improved ϵ-removal method is disclosed that computes for any input weighted automaton A with ϵ-transitions an equivalent weighted automaton B with no ϵ-transitions. The method comprises two main steps. The first step comprises computing for each state "p" of the automaton A its ϵ-closure. The second step in the method comprises modifying the outgoing transitions of each state "p" by removing those labeled with ϵ. The method next comprises adding to the set of transitions leaving the state "p" non-ϵ-transitions leaving each state "q" in the set of states reachable from "p" via a path labeled with ϵ with their weights pre-(x) multiplied by the ϵ-distance from state "p" to state "q" in the automaton A. State "p" is a final state if some state "q" within the set of states reachable from "p" via a path labeled with ϵ is final and the final weight $$\rho[p] = \bigoplus_{q \in \varepsilon[p] \cap F} (d[p, q] \otimes \rho[q]).$$

10 Claims, 9 Drawing Sheets

OTHER PUBLICATIONS

Mehryar Mohri et al.; A Rational Design for a Weighted Finite-State Transducer Library. Proceedings of the Second International Workshop on Implementing Automata (WIA '97). vol. 1436 of Lecture Notes in Computer Science, pp. 144-158. Sep. 1998.

Van Noord, Gertjan; "Treatment of Epsilon Moves in Subset Construction;" Computational Linguistics, vol. 26, No. 1, pp. 61-76, Mar. 2000.

"Weighted Automata in Text and Speech Processing" by M. Mohri et al., AT&T Corp. 1966, ECAI 96. $12^{th}$ European Conference on Artificial Intelligence, edited by W. Wahlster, Published in 1996 by John Wiley & Sons, Ltd., 5 pages.

"The Design Principles of Weighted Finite-State Transducer Library," by M. Mohri et al., Preprint submitted to Elsevier Preprint, May 3, 1999, 19 pages.

"Speech Recognition by Composition of Weighted Finite Automata," by F.C.N. Pereira et al., AT&T Labs—Research, Murray Hill, New Jersey, Apr. 20, 1996, 24 pages "State Assignment of Finite-State Machines," by I. Ahmad et al., IEEE Proc. Comput. Digit. Tech., vol. 147, No. 1, Jan. 2000, 8 pages.

Mohri, "Generic Epsilon-Removal Algorithm for Weighted Automata," in Sheng Yu Andrei Paun, ed., $5^{th}$ International Conference, CIAA 2000, v. 2088 of Lecture Notes in Computer Science, Springer-Verlag, 2001.

* cited by examiner

```
1  M_ε ← M_i|{ε}
2  M_0 ← M_i|Σ*−{ε}
3  G_ε ← CLOSURE(M_ε)
4  for p ← 1 to |V|
5      do  for each e ∈ Trans G_ε[p]
6          do  for each t ∈ Trans_{M_i}[Next(e)] ∧ i(t) ≠ ε
7              do  t' ← FINDTRANS (i(t), Next(t), Trans_{M_0}[p])
8                  w(t') ← w(t') ⊕ w(t) ⊗ w(e)
```

FIG. 7

```
GENERIC-SINGLE-SOURCE-SHORTEST-DISTANCE (B,s)
1   for each  p ∈ Q
2       do   d[p] ← r[p] ← \bar{0}
3   d[s] ← r[s] ← \bar{1}
4   S ← {s}
5   while  S ≠ 0
6       do   q ← head(S)
7            DEQUEUE(S)
8            r ← r(q)
9            r(q) ← \bar{0}
10           for each  e ∈ E[q]
11               do if  d[n[e]] ≠ d[n[e]] ⊕ (r ⊗ w[e])
12                   then  d[n[e]] ← d[n[e]] ⊕ (r ⊗ w[e])
13                         r[n[e]] ← r[n[e]] ⊕ (r ⊗ w[e])
14                         if  n[e] ∉ S
15                             then  ENQUEUE(S,n[e])
16  d[s] ← \bar{1}
```

SYSTEM AND METHOD OF EPSILON REMOVAL OF WEIGHTED AUTOMATA AND TRANSDUCERS

PRIORITY

This application is a continuation application of U.S. patent application Ser. No. 11/214,254, filed on Aug. 29, 2005, now U.S. Pat. No. 7,383,185, which is a continuation of U.S. patent application Ser. No. 09/910,090, filed on Jul. 20, 2001, now U.S. Pat. No. 7,027,988, which is related to U.S. patent application Ser. No. 09/910,093, filed on Jul. 20, 2001, now abandoned. The contents of the application are incorporated herein.

FIELD OF THE INVENTION

The present invention is directed to a system and method for epsilon removal of weighted automata and transducers. More specifically, the present invention relates to a system and method of computing a weighted automaton B with no epsilons that is equivalent to the input automaton A.

BRIEF DESCRIPTION OF THE RELATED ART

In natural language processing and speech recognition systems, certain algorithms and processes have been developed to receive speech signals and determine what word or phrase has been spoken. The algorithms and processes for speech processing applications are a particular application of finite state machines (FSMs). Finite state machines are devices that allow for simple and accurate design of sequential logic and control functions. Finite state machines have many applications and while the present disclosure specifically relates to speech recognition systems, the basic principles disclosed herein may have other applications beyond speech recognition or signal processing. Some examples of other contexts in which the present invention may apply include text-processing systems such as information extraction systems, or systems for information retrieval, pattern matching, and computational biology. An FSM is called a "finite" state machine because there are only a limited (finite) number of states. In a simple sense, a door is a finite state machine because it can be in one of two states: open or closed.

A main design tool for FSMs is the state transition diagram or state diagram. The state transition diagram illustrates the relationships between the system states and the events that cause the system to change from one state to the next. FIG. 1, discussed below, illustrates an example state transition diagram in the speech recognition process. Disclosed herein are previous methods and systems for converting a particular FSM into a more simple and efficient FSM that maintains the same functionality as the original FSM. The previous methods relate to removing unnecessary transitions from state to state within an FSM.

It is well known that finite state techniques have proven invaluable in a variety of natural language processing applications. A tool useful in natural language processing is the weighted finite state automata and weighted finite state transducer. Such a transducer is described in U.S. patent application No. 6,032,111 to Mehryar Mohri, assigned to AT&T Corp., and which contents are incorporated herein by reference. Further background maybe gained from "The Design Principles of a Weighted Finite-State Transducer Library" by Mehryar Mohri, Fernando Pereira and Michael Riley, available on the Internet at: http://citeseer.nj.nec.com/mohri00design.html; and "Weighted Automata in Text and Speech Processing", by Mehryar Mohri, Fernando Pereira, and Michael Riley, found on the Internet at: http://citeseer.nj.nec.com/mohri96weighted.html. The contents of these two publications are incorporated herein by reference for background information.

FIG. 1 illustrates a weighted automaton 10 where each circle 12 is a "state" and the arrows between the states 14, 16 represent events causing the change of state. The weights given to the state transitions are positive real numbers representing negative logarithms of probabilities. Weights along the paths are added and when several paths correspond to the same string, the weight of the string is the minimum of the weights of those paths. Transitions 16 represent the $\epsilon$-weighted transitions discussed herein. The $\epsilon$-weighted transitions are "empty" strings with no value.

Weighted automata are efficient and convenient devices used in many applications such as text, speech and image processing. The automata obtained in such applications are often the result of various complex operations, some of them introducing the empty string "$\epsilon$". For the most efficient use of an automaton, it is preferable to remove the $\epsilon$'s of automata since in general they introduce delay when used. An algorithm that constructs an automaton B with no $\epsilon$'s equivalent to an input automaton A with $\epsilon$'s is called an "$\epsilon$-removal" algorithm.

The relevant art does not present $\epsilon$-removal of unweighted automata as an independent algorithm deserving a specific study. Instead, the $\epsilon$-removal process is often mixed with other optimization algorithms such as determinization. This usually makes the presentation of determinization more complex and the underlying $\epsilon$-removal process obscure. Since $\epsilon$-removal is not presented as an independent algorithm, it is usually not analyzed and its running time complexity not clearly determined.

The present disclosure will provide discussion and explanation of a finite-state library algorithm for removal of an $\epsilon$-weight on automata and transducers. The concepts of weights to automata, automatons, and transducers, as well as known algorithms for e-removal are discussed. One of ordinary skill in the art will be familiar with the terms waited acceptor, weighted transducer, automata, automaton, and semiring. Background and information on these terms may be found in the references cited above as well as other well-known documentation.

Weight in the automata is a generalization of the notion of automaton: each transition of a weighted automaton is assigned a weight in addition to the usual labels. More formally, a weighted acceptor over finite alphabets and a semiring K is a finite directed graph with nodes representing states and arcs representing transitions in which each transition t is labeled with an input $i(t) \in \Sigma$ and a weight $w(t) \in K$.

Furthermore, each state t has an initial weight and a final weight. In a weighted transducer, each transition t has also an output label $o(t) \in \Delta^*$ where $\Delta$ is the transducer's output alphabet. A state q is initial if $\lambda(q) \neq \overline{0}$, and final if $p(q) \neq \overline{0}$. For more information on the mathematical operations of the equations disclosed herein, see Werner Kuich and Arto Salomaa, Semirings, Automata, Languages, number 5 in EATCS Monographs on Theoretical Computer Science, published by Springer-Verlag, Berlin, Germany, 1986. A person of ordinary skill in the art will understand the algebraic operation and symbols used in the formulas disclosed herein. Therefore, an explanation of each algebraic operator and of the various terms used in the formulas is not provided.

In the design of a weighted finite state transducer library, most algorithms operate on general weighted automata and transducers. The general framework for solving all pairs shortest-paths problems—closed semirings—is compatible with the abstract notion of weights commonly used, thus it is preferable to include an efficient version of the generic algorithm of the Floyd-Warshall algorithm in some finite-state machine libraries. The Floyd-Warshall algorithm addresses the desire in finite-state machine libraries to determine the shortest distance between all nodes and all other nodes in the finite state machine. Determining these shortest distance values for each node to each other node relates to the problem of "All-Pairs-Shortest-Path" which is solved by the Floyd-Warshall algorithm. Using the Floyd-Warshall algorithm code can provide the all pairs shortest distances when the weights between the nodes are real numbers representing, for example, probabilities but also when they are strings or regular expressions. This case is useful to generate efficiently a regular expression equivalent to a given automaton. The Floyd-Warshall algorithm is also useful in the general ε-removal algorithm discussed next.

Composition is the key operation on weighted transducers. The composition algorithm in the weighted case is related to the standard unweighted transducer composition and acceptor intersection algorithms, but in general weighted ε-transitions complicate matters. The input or output label of a transducer transition may be the symbol ε representing a null label. A null input label indicates that no symbol needs to be consumed when traversing the transition, and a null output label indicates that no symbol is output when traversing the transition. Null labels are needed because input and output strings do not always have the same length. For example, a word sequence is much shorter than the corresponding phonetic transcription. Null labels are a convenient way of delaying inputs or outputs, which may have important computation effects. In the weighted finite-state transducers used for example in speech recognition, transitions with null labels may also have a weight.

The presence of null labels makes the composition operation for weighted transducers more delicate than that for unweighted transducers. The problem is illustrated with the composition of the two transducers A and B shown in FIGS. 2(a) and 2(b). Transducer A has output null transitions, while transducer B has input null transitions. To help understand how these null transitions interact, refer to derived transducers A' and B' in FIGS. 2(c) and 2(d). In transducer A', the output null transitions are labeled ε2, and the corresponding null moves in B' are explicitly marked as self-transitions with input label ε2. Likewise, the input null transitions of B are labeled with ε1 in B', and the corresponding self-transitions in A' have output label ε1. Any transition in the composition of A and B has corresponding transition in the composition of A' and B', but whereas an output null label in A or an input null label in B corresponds to staying in the same state on the other transducer, in the composition of A' and B', the corresponding transition is made from a pair of transitions with matching A-output and B-input labels εi.

FIG. 3 illustrates the pseudocode of a generic epsilon removal algorithm for weighted automata. This ε-removal algorithm is explained further in the article: "The Design Principles of a Weighted Finite-State Transducer Library" incorporated above. Given a weighted automaton Mi, the algorithm returns an equivalents weighted automaton Mo without ε-transitions. TransM[s] denotes to set of transitions leaving state s in an automaton M, Next(t) denotes the destination state of transition t, i(t) denotes its input label, and w(t) its weight. Lines 1 and 2 extract from Mi the subautomaton Mε containing all the non-ε transitions. Line 3 applies the general all-pairs shortest distance algorithm CLOSURE to Mε to derive the ε-closure Gε. The nested loops starting in lines 4, 5 and 6 iterate over all pair of an ε-closure transition e and a non-ε transition t such that the destination of e is the source of t. Line 7 looks in Mo for a transition t' with label I(t) from e's source from t's destination if it exists, or creates a new one with eight O if it does not. This transition is the result of extending t "backwards" with the Mi ε-path represented by ε-closure transition e. Its weight, updated in line 8, is the semiring sum of such extended transitions with a given source destination and label.

In most speech processing applications, the appropriate weight algebra is the tropical semiring. Weights are positive real numbers representing negative logarithms of probabilities. Weights along the path are added; when several paths correspond the same string in the weigh of the string is the minimum of the weights of those paths.

As noted before, the computation of the key closure requires the computation of the all pairs shortest distances in Me. In the case of idempotent semirings such as the tropical semiring, the most efficient algorithm available is Johnson's algorithm, which is based on the algorithms of Dykstra and Bellman-Ford. Details regarding Johnson's algorithm are found in T. Cormen, C. Leiserson and R. Rivest, Introduction to Algorithms, published by the MIT Press, Cambridge, Mass., 1992.

For running time, complexity of Johnson's algorithm is $O(|Q|2 \log|Q|+|Q||E|)$ when using Fibonacci heaps, but often the more general but less efficient Floyd-Warshall algorithm is used instead because it supports non-idempotent closed semirings. Further details regarding Fibonacci heaps are found in Introduction to Algorithms referenced above. When Mε is acyclic, the linear time topological sort algorithm is used which also works with non-idempotent semirings.

FIG. 4 illustrates the result of an application of ε-removal to a weighted automata of the tropical semiring of FIG. 1. The example shows that the ε-removal algorithm generalizes the classical unweighted algorithm by ensuring that the weight of any string accepted by the automaton is preserved in the ε-free result 20. In FIG. 4, the states 22 and transitions 24 of the ε-free automaton 20 preserve the weight of any string accepted by the original automaton 10 shown in FIG. 1.

There are inefficiencies within the related use of ε-removal algorithms. For example, the ε-removal process is often presented in a mixture of other optimization algorithms such as determinations. See, e.g., A. V. Aho, R. Sethi, and J. D. Ullman, Compilers, Principles, Techniques and Tools, published by Addison Wesley, Reading, Mass., 1986. A generalization of the Floyd-Warshall algorithm is typically used in connection with ε-removal and introduces inefficiencies. First, in the ε-removal algorithm explained above, Mε was decomposed into strongly connected components, and then the Floyd-Warshall algorithm was applied to each component, and then the acyclic algorithm was applied to the component graph of Mε to compute the final results. These computational inefficiencies experienced by using the Floyd-Warshall algorithm were usually accepted given that each strongly connected component of Mε is small relative to Mε's overall size.

Another disadvantage of obscuring the ε-removal process via its use with other algorithms is the difficulty in an independent analysis of the running-time complexity and efficiency of ε-removal. Therefore, accurate assessment of the efficiencies of such ε-removal processes becomes very difficult.

SUMMARY OF THE INVENTION

What is needed in the art is an independent ε-removal method for weighted automata and transducers defined over a semiring. The algorithm, computer readable medium and circuitry disclosed herein improves the efficiency of weighted automata used in applications such as speech recognition systems, speech synthesis systems and text processing systems. The ϵ-removal method is preferably used in the case of unweighted automata and transducers and weighted automata and transducers defined over the tropical semiring based on the general shortest distance algorithm described herein.

An improved ϵ-removal method is disclosed that computes for any input weighted automaton A with ϵ-transitions an equivalent weighted automaton B with no ϵ-transitions. The method comprises two main steps. The first step consists of computing for each state "p" of the input automaton A its ϵ-closure denoted by C[p]:

$$C[p] = \{(q, w) : q \in \epsilon[p], d[p, q] = w \in K - \{\overline{0}\}\}$$

Where ϵ[p] represents a set of states reachable from "p" via a path labeled with ϵ. The second step consists of modifying the outgoing transitions of each state "p" by removing those labels with ϵ and by adding to be non-ϵ-transitions leading each state q with their weights pre-$\otimes$-multiplied by d[p,q].

The second step in the method comprises modifying the outgoing transitions of each state "p" by removing those labeled with ϵ. The method adds to the set of transitions leaving the state "p" non-ϵ-transitions leaving each state "q" in the set of states reachable from "p" via a path labeled with ϵ with their weights pre-$\otimes$-multiplied by the ϵ-distance from state "p" to state "q" in the automaton A. State "p" is a final state if some state "q" within the set of states reachable from "p" via a path labeled with ϵ is final and the final weight ρ[p] is $$\rho[p] = \bigoplus_{q \in \epsilon[p] \cap F} (d[p, q] \otimes \rho[q]).$$

The resulting automaton B is the equivalent of automaton A without the ϵ-transitions. Furthermore, the method disclosed herein has been implemented and is up to 600 times faster than previously known methods based on generalizations of algorithms such as the Floyd-Warshall algorithm.

The epsilon removal algorithm according to an aspect of the present invention of weighted automatic and transducers is a general optimization algorithm useful in all applications where weighted automata and transducers are used: speech recognition, speech synthesis, text processing, genome processing, information extraction, etc. Thus the present invention provides a dramatic improvement in the removal of epsilons from word lattices, which are compact representations of a large number of recognition hypotheses with the associated weights, produced by a recognizer. The invention is preferably applied before the application of other optimizations such as weighted determinization and minimization.

The claims presented herein are directed to a computer readable medium or a circuit that accomplish the method disclosed herein. Furthermore, the present claims are directed to the resulting automaton or transducer produced according to the epsilon removal methods disclosed herein.

BRIEF DESCRIPTION OF THE DRAWINGS

The foregoing advantages of the present invention will be apparent from the following detailed description of several embodiments of the invention with reference to the corresponding accompanying drawings, in which:

FIG. 7 illustrates a generic single source shortest distance algorithm used in connection with the first step in the first embodiment of present invention;

DETAILED DESCRIPTION OF THE INVENTION

Figure 1:
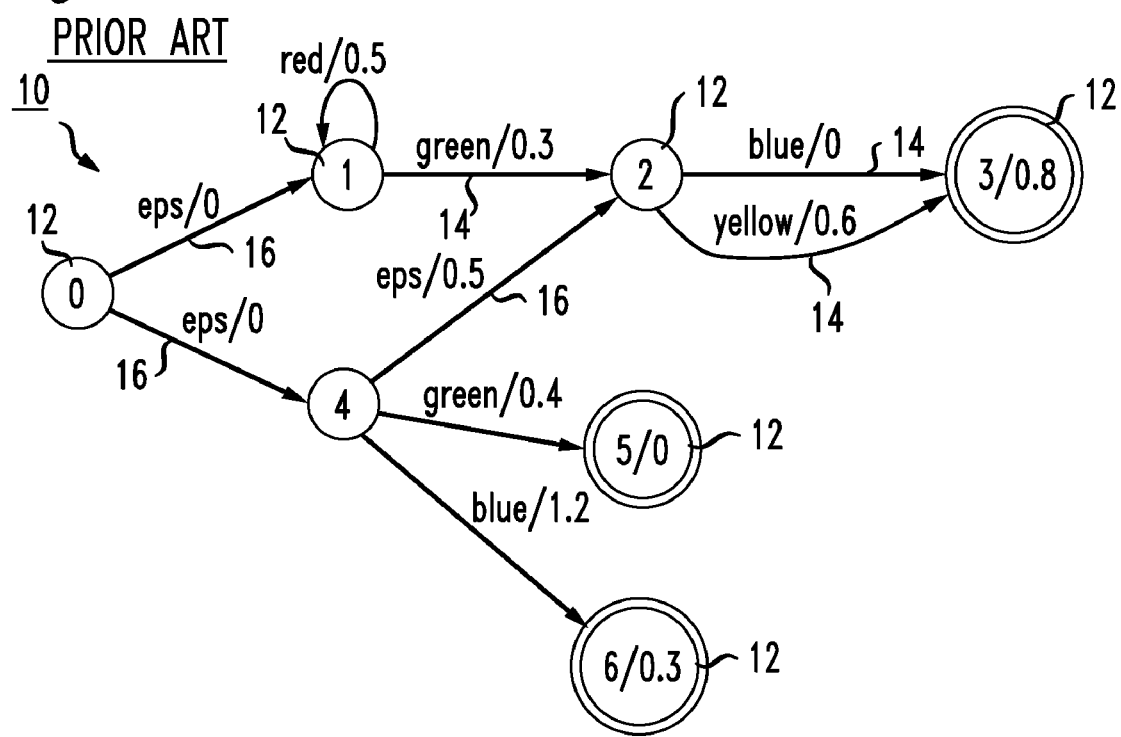
FIG. 1 illustrates a weighted automaton.
Figure 2A:
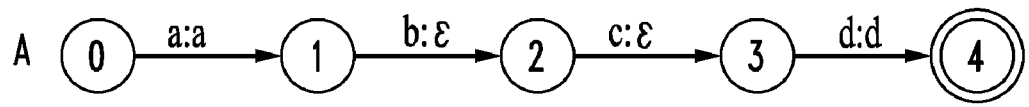
FIGS. 2(a)-2(b) illustrate the problem of the present of no labels that makes the composition operation for weighted transducers more difficult.
Figure 2B:
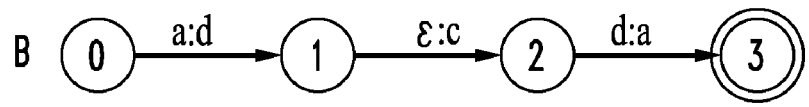
Figure 2C:
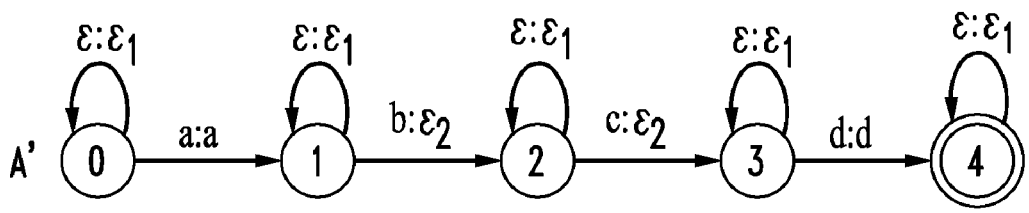
FIGS. 2(c)-2(d) illustrate how null transitions interact with relation to two derived transducers A' and B'.
Figure 2D:
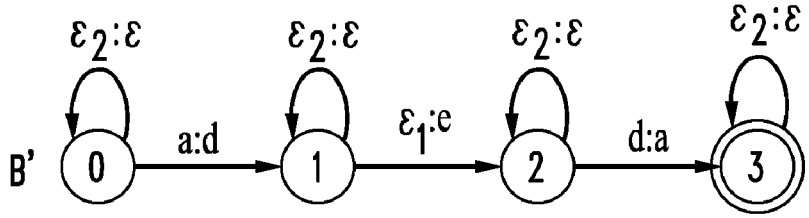
Figures 3, 4:
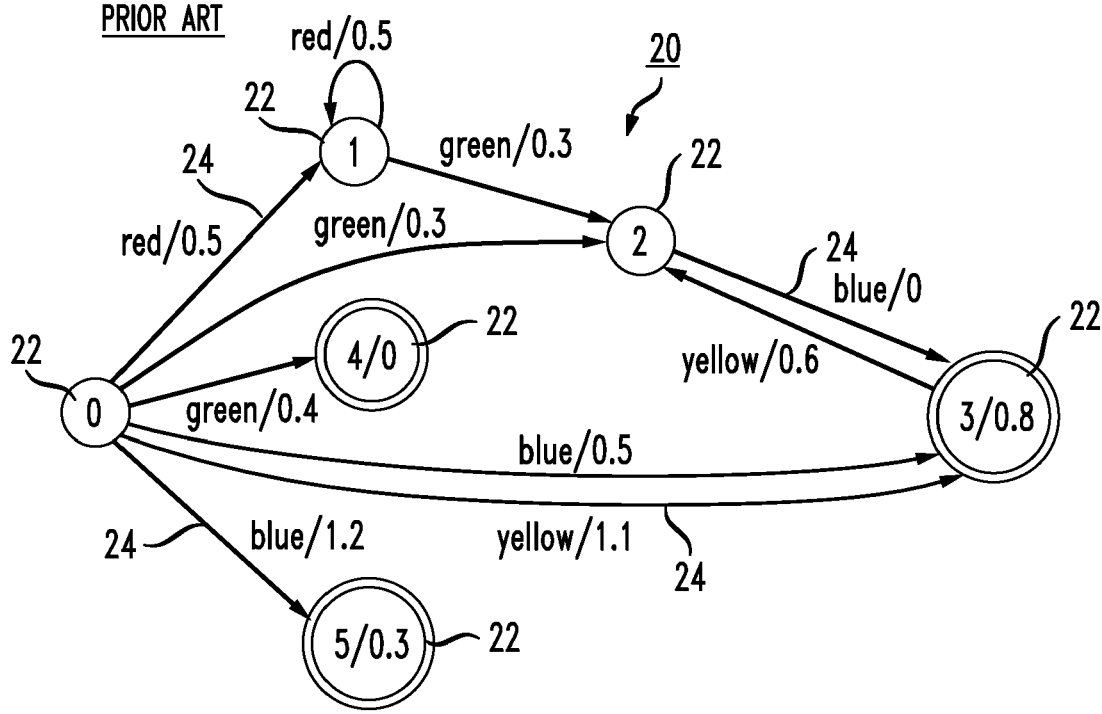
FIG. 3 illustrates a pseudocode of the related art general ϵ-removal algorithm.
FIG. 4 illustrates a weighted automaton after an ϵ-removal process.

Presented and disclosed herein is a novel generic ϵ-removal system and method for weighted automata and transducers defined over a semiring. The system or method can be used with any large class of semirings (framework) that covers the practical case of the semirings currently used for speech processing but that also includes other semirings that can be useful in speech and other domains. The system and method of the present invention also works with any queue discipline adopted, e.g., first-in-first-out (FIFO), shortest-first, etc. The present invention works with any k-closed semiring.

The present invention is particularly useful for unweighted automata and transducers and weighted automata and transducers defined over the tropical semiring. The invention is based on a general shortest-distance algorithm that is described briefly herein.

The method of the present invention is the first embodiment and will be described using example pseudocode and its running time complexity. The present disclosure further discusses the more efficient case of acyclic automata, an on-the-fly implementation of the method and an approximation method in the case of the semirings not covered by a specific framework.

First Embodiment

The first embodiment is illustrated with several semirings. Also described is an input ϵ-normalization method for weighted transducers, which is based on the general shortest-distance algorithm. The ϵ-normalization method, which works with all semirings covered by a specific framework, admits an on-the-fly implementation. An on-the-fly implementation allows one to use the algorithm with a lazy evaluation. In other words, instead of removing all the epsilons of the input machine all at once, one can remove only the epsilons that belong to the paths of the input a machine that one might be interested in. So, when some part of the input machine A is read, the output B (w/o epsilons) is constructed just for that part of A.

As discussed above, weighted automata are automata in which the transitions are labeled with weights in addition to the usual alphabet symbols. For various operations to be well defined, the weight set needs to have the algebraic structure of a semiring. What follows includes some preliminary definitions and explanations of some terms necessary for understanding the present invention. A system $(K, \oplus, \otimes, \overline{0}, \overline{1})$ is a right semiring if:

1. $(K, \oplus, \overline{0})$ is a commutative monoid with $\overline{0}$ as the identity element for $\oplus$,
2. $(K, \otimes, \overline{1})$ is a monoid with $\overline{1}$ as the identity element for $\otimes$,
3. $\otimes$ right distributes over $\oplus$: $\forall a, b, c \in K$, $(a \oplus b) \otimes c = (a \otimes c) \oplus (b \otimes c)$,
4. $\overline{0}$ is an annihilator for $\otimes$: $\forall a \in K, a \otimes \overline{0} = \overline{0} \otimes a = \overline{0}$.

Left semirings are defined in a similar way by replacing right distributivity with left distributivity. $(K, \oplus, \otimes, \overline{0}, \overline{1})$ is a semiring if both left and right distributivity hold. Thus, more informally, a semiring is a ring that may lack negation. As an example, $(N, +, \cdot, 0, 1)$ is a semiring defined on the set of nonnegative integers $N$.

A semiring $(K, \oplus, \otimes, \overline{0}, \overline{1})$ is said to be idempotent if for any a $\in K, a \oplus a = a$. The Boolean semiring $\beta = (\{0,1\}, V, \Lambda, 0, 1)$ and the tropical semiring $T = (R \cup \{\infty\}, \min, +, \infty, 0)$ are idempotent, but $(N, +, \cdot, 0, 1)$ is not.

As a second definition, a weighted automaton $A = (\Sigma, Q, I, F, E, \lambda, \rho)$ over the semiring K is a '7-tuple where $\Sigma$ is the finite alphabet of the automaton, Q is a finite set of states, $I \subseteq Q$ the set of initial states, $F \subseteq Q$ the set of final states, $E \subseteq Q \times \Sigma \times K \times Q$ a finite set of transitions, $\lambda: I \to K$ is the initial weight function mapping I to K, and $\rho: F \to K$ is the final weight function mapping F to K.

Given a transition $e \in E$, according to the present disclosure, i[e] is denoted as its input label, w[e] its weight, p[e] its origin or previous state and n[e] its destination state or next state. Given a state $q \in Q$, E[q] is the set of transitions leaving q, and by $E^R[q]$ the set of transitions entering q.

A path $\pi = e_1 \ldots e_k$ in A is an element of E* with consecutive transitions: $n[e_{i-1}] = p[e_i]$, $i = 2, \ldots, k$. The variables n and p are extended to paths by setting: $n[\pi] = n[e_k]$ and $p[\pi] = p[e_1]$. The notation P(q,q') represents the set of paths from q to q'.

P can be extended to subsets $R \subseteq Q R' \subseteq Q$, by:

$$P(R, R') = \bigcup_{\substack{q \in R, \\ q' \in R'}} P(q, q')$$

The labeling function i and the weight function w can also be extended to paths by defining the label of a path as the concatenation of the labels of its constituent transitions, and the weight of a path as the $\otimes$-product of the weights of its constituent transitions:

$$i[\pi] = i[e_1] \ldots i[e_k]$$

$$w[\pi] = w[e_1] \otimes \ldots \otimes w[e_k]$$

Given a string $\chi \in \Sigma^*$, $P(\chi)$ represents the set of paths from I to F labeled with $\chi$ $$P(\chi) = \{\pi \in P(I, F): i[\pi] = \chi\}$$

The output weight associated by A to an input string $\chi \in \Sigma^*$ is:

$$[A](\chi) = \bigoplus_{\pi \in P(x)} \lambda(p[\pi]) \otimes w[\pi] \otimes \rho(n[\pi])$$

If $P(x) = \overline{0}$, $[A](\chi)$ is defined to be $\overline{0}$. Note that weighted automata over the Boolean semiring are equivalent to the classical unweighted finite automata.

These definitions can be easily generalized to cover the case of any weighted automata with $\epsilon$-transitions. An $\epsilon$-removal algorithm computes for any input weighted automaton A with $\epsilon$-transitions an equivalent weighted automaton B with no $\epsilon$-transition, that is such that:

$$\forall \chi \in \Sigma^*, [A](\chi) = [B](\chi)$$

Weighted finite-state transducers are defined in a similar way.

As a further definition, a weighted transducer $T = (\Sigma, \Omega, Q, I, F, E, \lambda, \rho)$ over the semiring K is an 8-tuple where $\Sigma$ is the finite input alphabet of the transducer, $\Omega$ is the finite output alphabet of T, Q is a finite set of states, $I \subseteq Q$ the set of initial states, $F \subseteq Q$ the set of final states, $E \subseteq Q \times \Sigma \cup \{oo\} \times \Omega$, $\cup \{oo\} \times K \times Q$ a finite set of transitions, $\lambda: I \to K$ the initial weight function mapping I to K, and $\rho: F \to K$ the final weight function mapping F to K.

The output weight associated by T to an input string $x \in \Sigma$ and output string $y \in \Omega$ is:

$$[T](\chi, y) = \bigoplus_{\pi \in P(x, y)} \lambda(p[\pi]) \otimes w[\pi] \otimes \rho(n[\pi])$$

where P(x, y) is the set of paths with input label x and output label y.

The following definitions will help to define the framework for the generic $\epsilon$-removal algorithm of an embodiment of the present invention. Let $k > 0$ be an integer. A commutative semiring $(K, \oplus, \otimes, \overline{0}, \overline{1})$ is k-closed if:

$$\forall a \in K, \bigoplus_{n=0}^{k+1} a^n = \bigoplus_{n=0}^{k} a^n$$

When k=0, the previous expression can be rewritten as:

$$\forall a \in K, \overline{1} \oplus a = \overline{1}$$

and K is then said to be bounded. Semirings such as the Boolean semiring $\beta = (\{0,1\}, V, A, 0, 1)$ and the tropical semiring $T = (R_+ \cup \{\infty\}, \min, +\infty, 0)$ are bounded.

As yet another definition, let $k \geq 0$ be an integer, let $(K, \beta, \otimes, \overline{0}, \overline{1})$ be a commutative semiring, and let A be a weighted automaton over K. $(K, \beta, \otimes, \overline{0}, \overline{1})$ is right k-closed for A if for any cycle $\pi$ of A:

$$\bigoplus_{n=0}^{k+1} \omega[\pi]^n = \bigoplus_{n=0}^{k} \omega[\pi]^n$$

By definition, if K is k-closed, then it is k-closed for any automaton over K.

Given the above definitions and preliminary information, the first aspect of the first embodiment of the present invention is described next. This embodiment generally discloses a method of ϵ-removal for automatons. A second aspect of the first embodiment of the invention, discussed below, relates to an input ϵ-normalization method for transducers. Further embodiments disclosed below relate to an apparatus or system for ϵ-removal.

According to the first embodiment of the invention, let A=(Σ,Q,I,F,E,λ,ρ) be a weighted automaton over the semiring K with ϵ-transitions. We denote by $A_\epsilon$ the automaton obtained from A by removing all transitions not labeled with ϵ. We present a general ϵ-removal algorithm for weighted automata based on a generic shortest-distance algorithm that works for any semiring K k-closed for $A_\epsilon$. It is assumed that K has this property. This class of semirings includes in particular the Boolean semiring ({0,1},V,Λ,0,1), the tropical semiring (R∪{∞},min,+∞,0) and other semirings not necessarily idempotent.

The method of the first embodiment of the invention is presented by way of example for the case of weighted automata. The case of weighted transducers can be straightforwardly derived from the automata case by viewing a transducer as an automaton over the alphabet ΣU{ϵ}×ΣU {ϵ}. An ϵ-transition of a transducer is then a transition labeled with (ϵ,ϵ).

For p, q in Q, the ϵ-distance from p to q in the automaton A is denoted by d[p, q] and defined as:

$$d[p, q] = \bigoplus_{\pi \in P(p,q), i[\pi]=\varepsilon} \omega[\pi]$$

This distance is well-defined for any pair of states (p,q) of A when K is a semiring k-closed for $A_\epsilon$. By definition, for any ∈Q,d[p,p]=1̄. The value d[p,q] is the distance from p to q in $A_\epsilon$. The class of semirings with which the generic shortest-distance algorithm works can in fact be extended to that of right semirings right k-closed for $A_\epsilon$. Related disclosure is found in U.S. patent application No. 09/495,174, filed Feb. 1, 2001, by Mehryar Mohri, the contents of which application are incorporated herein.

The first embodiment of the invention comprises two main steps. The first step comprises computing for each state p of the input automaton A its ϵ-closure denoted by C[p]:

$$C[p]=\{(q,w): q \in \epsilon[p], d[p,q]=w \in K-\{\bar{0}\}\}$$

where ϵ[p] represents the set of states reachable from p via a path labeled with ϵ. This step is described in more detail later with a discussion of ϵ-closures. The epsilon-closure step determines for each state p the set of states q that can be reached from p by paths labeled with epsilon. It also gives the total weight corresponding to all the epsilon-paths from p to q. The states q and their weights are used in the second step to remove all the epsilon-paths from p to q, to create new transitions from p to q with their weights adjusted with the weights of the states q.

The second step comprises modifying the outgoing transitions of each state p by removing those labeled with ϵ and by adding to E[p] non-ϵ-transitions leaving each state q∈ϵ[p] with their weights pre-⊗-multiplied by d[p,q]. The following is example ϵ-removal(A) pseudocode related to the second step of this embodiment of the invention.

```
1  for each p ∈ Q
2     do E[p] ← {e ∈ E [p] : i[e] ≠ ϵ}
3        for each (q,w) ∈ C[p]
4           do E[p] ← E[p] ∪ {(p,a,w ⊗ w',r) : (q,a, w', r) ∈ E[q],a ≠ ϵ}
5              if q ∈ F
6                 then if p ∉ F
7                    then F ← F ∪ {p}
8                       ρ[p] ← ρ[p] ⊕ (ω ⊕ ρ[q])
```
State p is a final state if some state q ∈ ϵ[p] is final. If so, then the final weight ρ[p] is then:

$$\rho[p] = \bigoplus_{q \in \epsilon[p] \cap F} (d[p, q] \otimes \rho[q])$$

Note the difference in the equations between the Greek letter "ρ" and the English letter "p". After removing ϵ's at each state p, some states may become inaccessible if they could only be reached by ϵ-transitions originally. Those states can be removed from the result in time linear in the size of the resulting machine using, for example, a depth-first search of the automaton. A depth-first search of the automaton may be accomplished, for example, by a classic algorithm disclosed in *Introduction to Algorithm,* by T. Cormen, C. Leiserson and R. Rivest, published by the MIT Press, Cambridge, Mass., 1992.

Figure 5A:
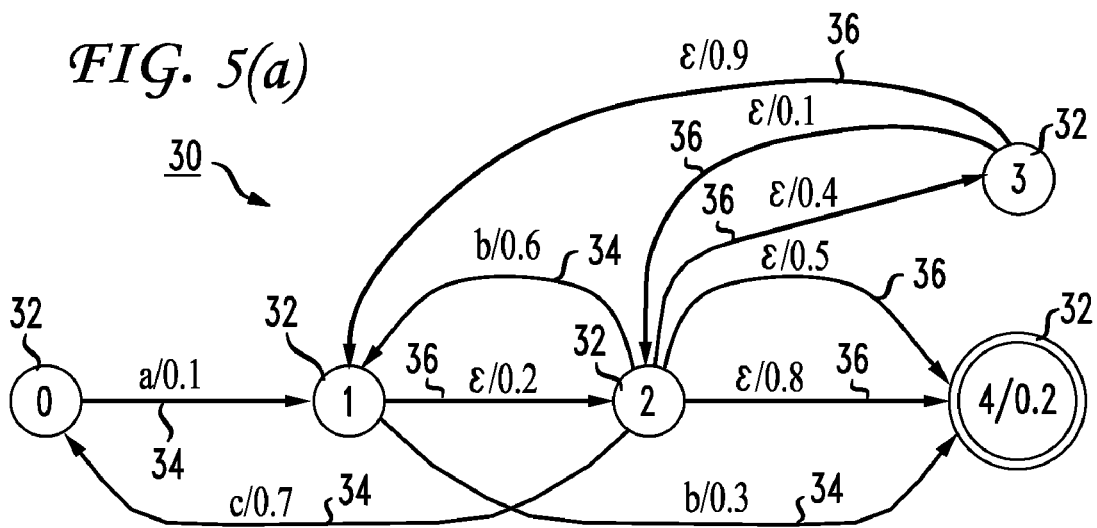
FIG. 5(a) illustrates a tropical semiring for a weighted automaton A with ϵ-transitions.
Figure 5B:
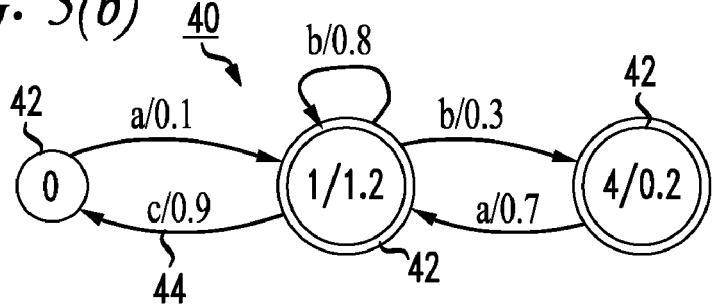
FIG. 5(b) illustrates a weighted automaton B equivalent to A result of the ϵ-removal algorithm according to the first embodiment of the present invention.
Figure 5C:
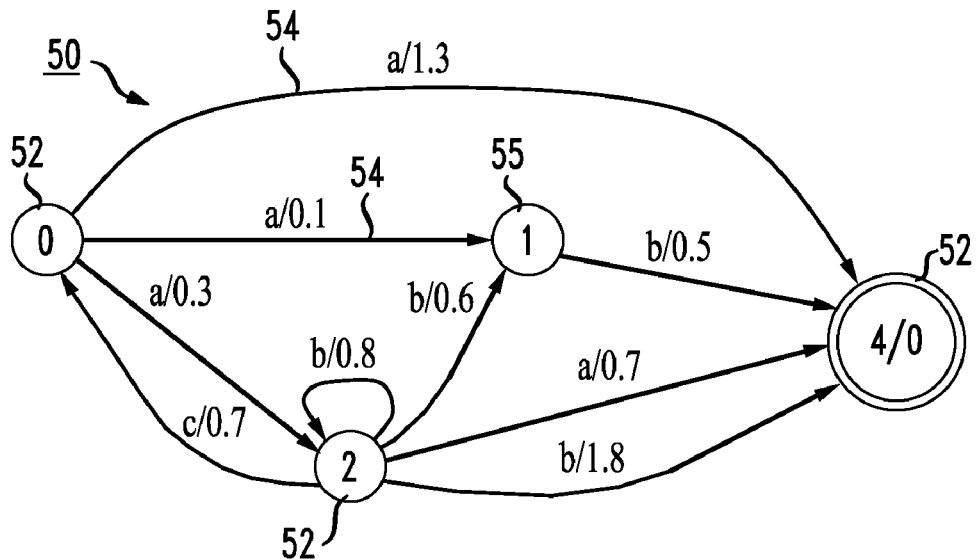
FIG. 5(c) illustrates a weighted automaton C equivalent to A obtained by application of ϵ-removal to the reverse of A.

FIGS. 5(a)-(c) illustrate the use of the algorithm in the specific case of the tropical semiring. A tropical semiring A 30 is shown in FIG. 5(a). The states 32 are connected with some non-ϵ-transitions 34 and some ϵ-transitions 36. The ϵ-transitions 36 can be removed in at least two ways: in the way described above, or the reverse.

FIG. 5(b) represents an automaton B produced by the ϵ-removal method of the first embodiment of the invention. Each state 42 is connected by non-ϵ-transitions 44 (only one transition is labeled but they are all non-ϵ-transitions). FIG. 5(c) represents an automaton C produced by applying ϵ-removal to the reverse of the automaton and re-reversing the result. As illustrated by FIGS. 5(b) and 5(c), different results can be obtained when applying the ϵ-removal method to an automaton or the reverse of an automaton. The different result is due to two factors that are independent of the semiring.

First, the number of states in the original automaton A whose incoming transitions (or outgoing transitions in the reverse case) are all labeled with the empty string. As mentioned before, those states can be removed from the result. For example, state 3 of the automaton of FIG. 5(a) can only be reached by ϵ-transitions and admits only outgoing transitions labeled with ϵ. Thus, that state does not appear in the result in both methods (FIGS. 5(b)-(c)). The incoming transitions of state 2 are all labeled with ϵ and thus it does not appear in the result of the ϵ-removal with the first method, but it does in the reverse method because the outgoing transitions of state 2 are not all labeled with ϵ.

The second factor is that the total number of non-ϵ-transitions of the states that can be reached from each state q in $A_\epsilon$ (the reverse of $A_\epsilon$, in the reverse case). This corresponds to the number of outgoing transitions of q in the result of ϵ-removal.

In practice, heuristics may reduce the number of states and transitions of the resulting machine although this will not affect the worst-case complexity of the method disclosed herein. One can for instance remove some ϵ-transitions in the reverse way when that creates less transitions and others in the way corresponding to the first method when that helps reducing the resulting size.

Figure 6A:
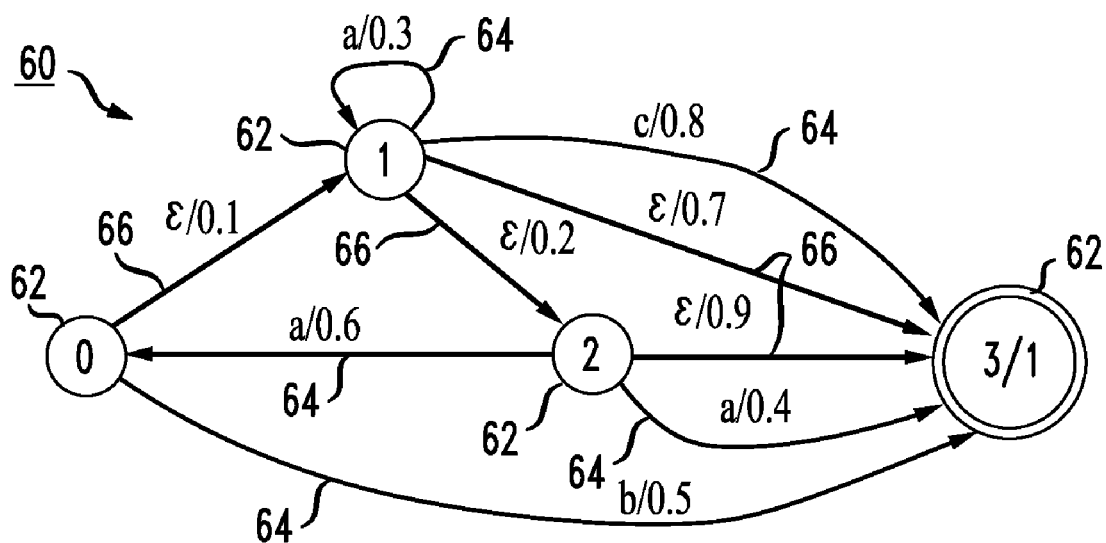
FIG. 6(a) illustrates ϵ-removal in the real semiring (R, +, *, 0, 1) for a weighted automaton A, where Aϵ is k-closed for (R, +, *, 0, 1)
Figure 6B:
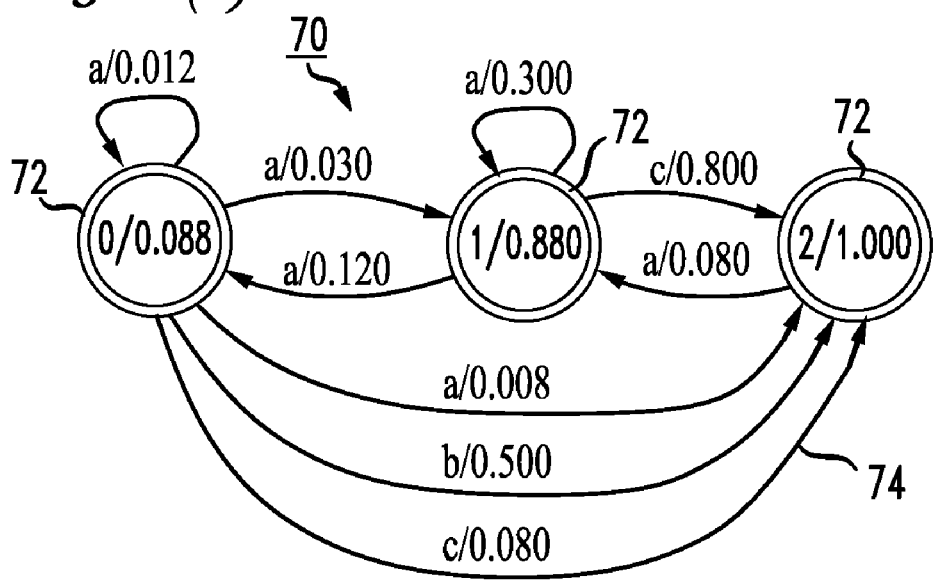
FIG. 6(b) illustrates a weighted automaton B equivalent to A output of the ϵ-removal algorithm.

FIGS. 6(a)-(b) illustrate the application of the ϵ-removal algorithm of the first embodiment of the invention in the case of another semiring, the semiring of real numbers, or automaton A 60. As shown in FIG. 6(*a*), the states 62 are connected via non-ε-transitions 64 and ε-transitions 66. The automaton $A_\epsilon$ is k-closed for (R,+,*,0,1). FIG. 6(*b*) shows the weighted automaton B 70 with states 72 and all none-ε-transitions 74 (only one transition is labeled) that is equivalent to automaton A 60. The general algorithm applies in this case since $A_\epsilon$ is acyclic.

As mentioned above with respect to the first step of the method according to the first embodiment of the invention, the computation of ε-closures is equivalent to that of all-pairs shortest-distances over the semiring K in $A_\epsilon$. There exists a generalization of the algorithm of Floyd-Warshall for computing the all-pairs shortest-distances over a semiring K under some general conditions. However, the running time complexity of that algorithm is cubic:

$$O(|Q|^3(T_\oplus + T_x + T^*))$$

where Tβ, T⊗ and T* denote the cost of ⊕, ⊗, and closure operations in the semiring considered. The algorithm can be improved by first decomposing $A_\epsilon$ into its strongly connected components, and then computing all-pairs shortest distances in each components visited in reverse topological order. However, it is still impractical for large automata when $A_\epsilon$ has large cycles of several thousand states. The quadratic space complexity $O(|Q|^2)$ of the algorithm also makes it prohibitive for such large automata. Another problem with this generalization of the algorithm of Floyd-Warshall is that it does not exploit the sparseness of the input automaton.

There exists a generic single-source shortest-distance algorithm that works with any semiring covered by the framework. The algorithm is a generalization of the classical shortest-paths algorithms to the case of the semirings of this framework.

This generalization is not trivial and does not require the semiring to be idem-potent. In particular, a straightforward extension of the classical algorithms based on a relaxation technique would not produce the correct result in general. The algorithm is also generic in the sense that it works with any queue discipline. FIG. 7 illustrates the pseudocode of the algorithm. The algorithm of FIG. 7 works in particular with the semiring (R,+,0,1) when the weight of each cycle of $A_\epsilon$ admits a well-defined closure.

Referring to FIG. 7, a queue S is used to maintain the set of states whose leaving transitions are to be relaxed. S is initialized to {s}. For each state q∈Q, two attributes are maintained: d[q]∈K an estimate of the shortest distance from s to q, and r[q]∈K the total weight added to d[q] since the last time q was extracted from S. Lines 1-3 initialize arrays d and r. After initialization, d[q]r[q]=$\overline{O}$ for q∈Q—{s}, and d[s]=r[s]=$\overline{1}$.

Given a state q∈Q and a transition e∈E[q], a relaxation step on e is performed by lines 11-13 of the pseudocode, where r is the value of r[q] just after the latest extraction of q from S if q has ever been extracted from S, its initialization value otherwise.

Each time through the while loop of lines 5-15, a state q is extracted from S (lines 6-7). The value of r[q] just after extraction of q is stored in r, and then r[q] is set to $\overline{O}$ (lines 8-9). Lines 11-13 relax each transition leaving q. If the tentative shortest distance d[n[e]] is updated during the relaxation and if n[e] is not already in S, the state n[e] is inserted in S so that its leaving transitions be later relaxed (lines 14-15). Whenever d[n[e]] is updated, r[n[e]] is updated as well. r[n[e]] stores the total weight ⊕ added to d[n[e]] since n[e] was last extracted from S or since the time after initialization if n[e] has never been extracted from S. Finally, line 16 resets the value of d[s] to $\overline{1}$.

In the general case, the complexity of the algorithm depends on the semiring considered and the queue discipline chosen for S:

$$O\left(|Q| + (T_\oplus + T_\otimes + C(A))|E|\max_{q \in Q} N(q) + (C(I) + C(E))\sum_{q \in Q} N(q)\right)$$

where N(q) denotes the number of times state q is extracted from S, C(E) the worst cost of removing a state q from the queue S, C(I) that of inserting q in S, and C(A) the cost of an assignment. This includes the potential cost of reorganization of the queue to perform this assignment.

In the case of the tropical semiring (R₊U{∞},mm,+,∞,0), the method shown in FIG. 7 coincides with classical single-source shortest-paths algorithms. In particular, it coincides with Bellman-Ford's algorithm when a FIFO queue discipline is used and with Dijkstra's algorithm when a shortest-first queue discipline is used. Using Fibonacci heaps, the complexity of Dijkstra's algorithm in the tropical semiring is:

$$O(|E| + |Q|\log|Q|)$$

The book *Introduction to Algorithms* by Cormen, Leiserson and Rivest, referenced above, provides further material for these algorithms. The complexity of the algorithm is linear in the case of an acyclic automaton with a topological order queue discipline:

$$O(|Q| + (T_\oplus + T_x)|E|)$$

Note that the topological order queue discipline can be generalized to the case of non-acyclic automata $A_\epsilon$, by decomposing $A_\epsilon$, into its strongly connected components. Any queue discipline can then be used to compute the all-pairs shortest distances within each strongly connected component.

The all-pairs shortest-distances of $A_\epsilon$ can be computed by running |Q| times the generic single-source shortest-distance algorithm. Thus, when $A_\epsilon$ is acyclic, that is, when $A_\epsilon$ admits no ε-cycle, then the all-pairs shortest distances can be computed in quadratic time:

$$O(|Q|^2 + (T_\oplus + T_x)|Q||E|)$$

When $A_\epsilon$ is acyclic, the complexity of the computation of the all-pairs shortest distances can be substantially improved if the states of $A_\epsilon$ are visited in reverse topological order and if the shortest-distance algorithm is interleaved with the actual removal of ε's. Indeed, one can proceed in the following way for each state p of $A_\epsilon$ visited in reverse topological order: (1) Run a single-source shortest-distance algorithm with source p to compute the distance from p to each state q reachable from p by ε's; and (2) Remove the ε-transitions leaving q as described in the previous section.

The reverse topological order guarantees that the ε-paths leaving p are reduced to the ε-transitions leaving p. Thus, the cost of the shortest-distance algorithm run from p only depends on the number of ε-transitions leaving p and the total cost of the computation of the shortest-distances is linear:

$$O(|Q| + (T_\oplus + T_x)|E|)$$

In the case of the tropical semiring and using Fibonacci heaps, the complexity of the first stage of the algorithm is:

$$O(|Q|\cdot|E|+|Q|^2\log|Q|)$$

In the worst case, in the second stage of the algorithm each state q belongs to the ε-closure of each state p, and the removal of ε's can create in the order of |E| transitions at each state. Hence, the complexity of the second stage of the algorithm is:

$$O(|Q|^2+|Q|\cdot|E|)$$

Thus, the total complexity of the algorithm in the case of an acyclic automaton $A_\epsilon$ is:

$$O(|Q|^2+(T_\oplus+T_x)|Q|\cdot|E|)$$

In the case of the tropical semiring and with a non acyclic automaton $A_\epsilon$, the total complexity of the algorithm is:

$$O(|Q|\cdot|E|+|Q|^2\log|Q|)$$

For some automata of about a thousand states with large ε-cycles, the inventor of the present invention has implemented the automata with an improvement of up to 600 times faster than the previous implementation based on a generalization of the Floyd-Warshall algorithm.

An important feature of the system and method of the present invention is that it admits a natural on-the-fly implementation. Indeed, the outgoing transitions of state q of the output automaton can be computed directly using the ε-closure of q. However, with an on-the-fly implementation, a topological order cannot be used for the queue S even if $A_\epsilon$ is acyclic since this is not known ahead of time. Thus, both an off-line and an on-the-fly version of the system and method of the present invention may be implemented. An on-the-fly algorithm can save space by removing only those epsilons that are necessary for the particular use of the input machine. An off-line algorithm simply applies to the entire machine and constructs the output regardless of what portion was really needed. In some cases as discussed above, the complexity of the off-line version is better because it can take advantage of the specific property of the machine (the fact that it is acyclic for example). This is not possible in the on-the-fly case. To allow for both uses, the present disclosure covers both the on-the-fly implementation and the off-line context.

The shortest-distance algorithm presented herein admits an approximation version where the equality of line 11 in the pseudocode of FIG. 7 is replaced by an approximate equality modulo some predefined constant δ. This can be used to remove ε-transitions of a weighted automaton A over a semiring K such as (R,+,* ,0,1), even when K is not k-closed for $A_\epsilon$. Although the transition weights are then only approximations of the correct results, this may be satisfactory for many practical purposes such as speech processing applications. Furthermore, one can arbitrarily improve the quality of the approximation by reducing δ. As mentioned before, one can also use a generalization of the Floyd-Warshall algorithm to compute the result in an exact way in the case of machines $A_\epsilon$ with relatively small strongly connected components and when the weight of each cycle of $A_\epsilon$ admits a well-defined closure.

Figure 8A:
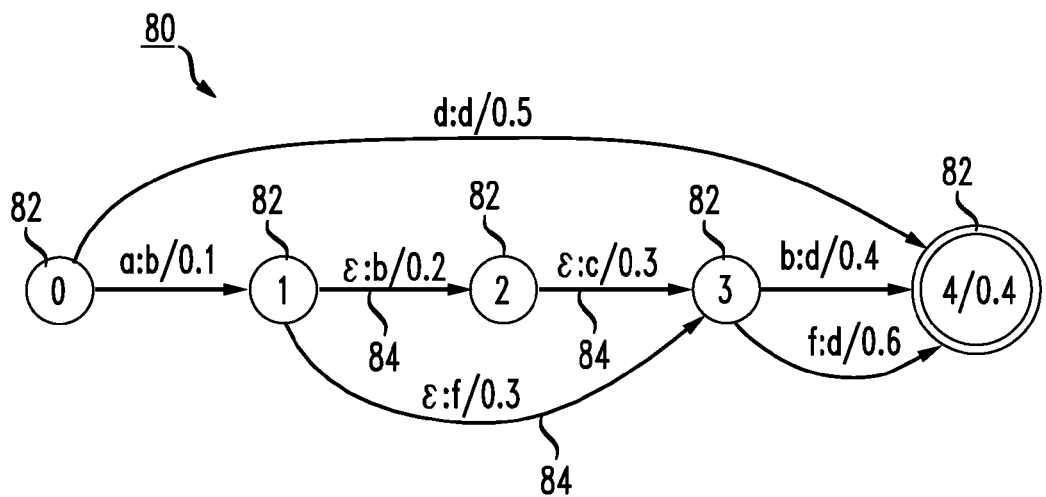
FIGS. 8(a) and 8(b) illustrate another aspect of the first embodiment of the invention regarding an input ϵ-normalization method for weighted transducers.
Figure 8B:
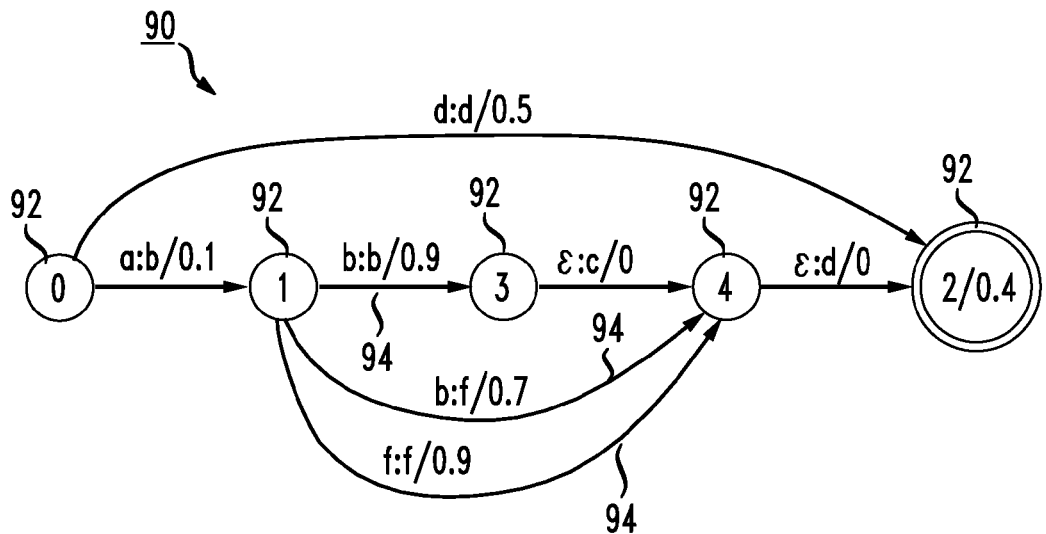

In another aspect of the first embodiment of the invention, a similar removal method is applied to transducers rather than automatons. The method according to this aspect of the first embodiment of the invention is closely related to the ε-removal method described above. As shown in FIGS. 8(a), let $T_1$ 80 be a weighted transducer over a k-closed semiring K $T_1$ includes states 82 and transitions with input label ε 84. In some applications, one may wish to construct a new transducer $T_2$ equivalent to $T_1$ such that $T_2$ has no ε-transition and such that along any successful path of $T_2$, no transition with input label different from c is preceded with a transition with input label ε. An exemplary transducer $T_2$ 90 is shown in FIG. 8(b) with states 92 and transitions 94 having the appropriate ε-transition removes as described above. FIG. 8(b) is the output of epsilon normalization. You don't remove all epsilon translation.

A transducer such as $T_2$ 90 is input-normalized and a method for constructing $T_2$ 90 from $T_1$ 80 is called an input ε-normalization method. The advantage of using a $T_2$ 90 so constructed is similar to the benefits of the ε-removal method of the first aspect of the first embodiment of the invention. Matching its input with algorithms such as composition does not require any unnecessary delay due to the presence of input ε's. FIGS. 8(a) and 8(b) illustrate the application of the algorithm in the case of a weighted transducer over the tropical semiring.

Note that the system $(\Sigma^*,\cup,\cap,\emptyset,\Sigma^*)$ defines an idempotent semiring K' over the set of strings $\Sigma^*$. A weighted transducer $T_1$ 80 over the semiring K can be viewed as a weighted automaton A over the cross-product semiring S=K'×K. An element of S is a pair $(\chi, w)$ where $\chi \in \Sigma^*$ is a string and $w \in K_1$ the original weight of the transducer.

The input ε-normalization method applies only to weighted transducers $T_1$ 80 over an arbitrary semiring K that do not admit any cycle with input label ε. Cycles with both input and output can be removed using for example the ε-removal method described according to the first aspect of the first embodiment of the invention. Since $T_1$ 80 does not admit any cycle with input label c, A does not admit any ε-cycle and the semiring S is k-closed for $A_\epsilon$. Thus the shortest-distance algorithm presented above can be used with $A_\epsilon$ and, more generally, the ε-removal algorithm presented in the previous section applies to A.

Figure 9A:
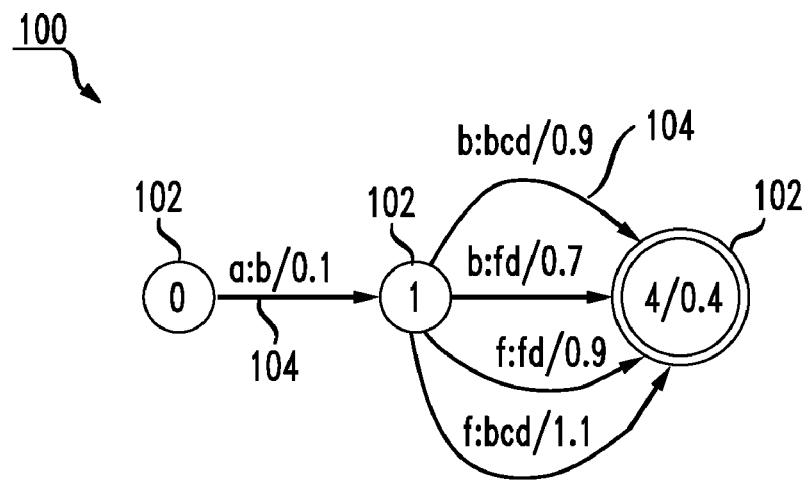
FIGS. 9(a) and 9(b) illustrate another aspect of the first embodiment of the invention regarding an input ϵ-normalization method for weighted transducers.

This input ε-normalization system and method relates to the ε-removal method in the specific case of semirings of the S type. The result of the ε-removal method is an acceptor with no ε but with weights in S. FIG. 9(a) shows the result of that algorithm when applied to the transducer $T_1$ of FIG. 8(a). The transducer 100 of FIG. 9(a) includes states 102 and transitions 104 (not all labeled) without any ε-transitions. The representation of transducers does not allow output labels to be strings, but transitions can be replaced with output strings by a set of consecutive transitions with outputs in $\Sigma \cup \{\epsilon\}$ in a trivial fashion. The result of that transformation is of interest and is useful in many contexts. However, the resulting transducer does not have the normalization property described above. To ensure that input ε's are not found on a path before an input non-ε label, there is a need to normalize the result of ε-removal in a different way. To each state p, a residual output string y is associated that needs to be output from that state.

States in the result of ε-normalization correspond to pairs (p, y) where p is a state of the original machine and y a residual output string. The residual string associated to an initial state is just ε. The outgoing transitions of a state $(p, y_0)$ are determined as follows. For each transition from state p to q with input label $\chi$, output string $y_1$ and weight $w_1$ in the result of the ε-removal algorithm, a transition is created from state $(p, y_0)$ to state $(q, a^{-1} y_0 y_1)$, with input $\chi$, output a and weight $w_1$, where a is the first letter of $y_0 y_1$, a=ε if $y_0 y_1 \epsilon$. A state $(p, y_0)$ is final if p is a final state of the original machine and if $y_0=\epsilon$. When p is final and $y_0 \neq \epsilon$, then a transition is created from $(p, y_0)$ to $(p, y_i)$ with input ε and output a with $y_0 a y_1$.

Figure 9B:
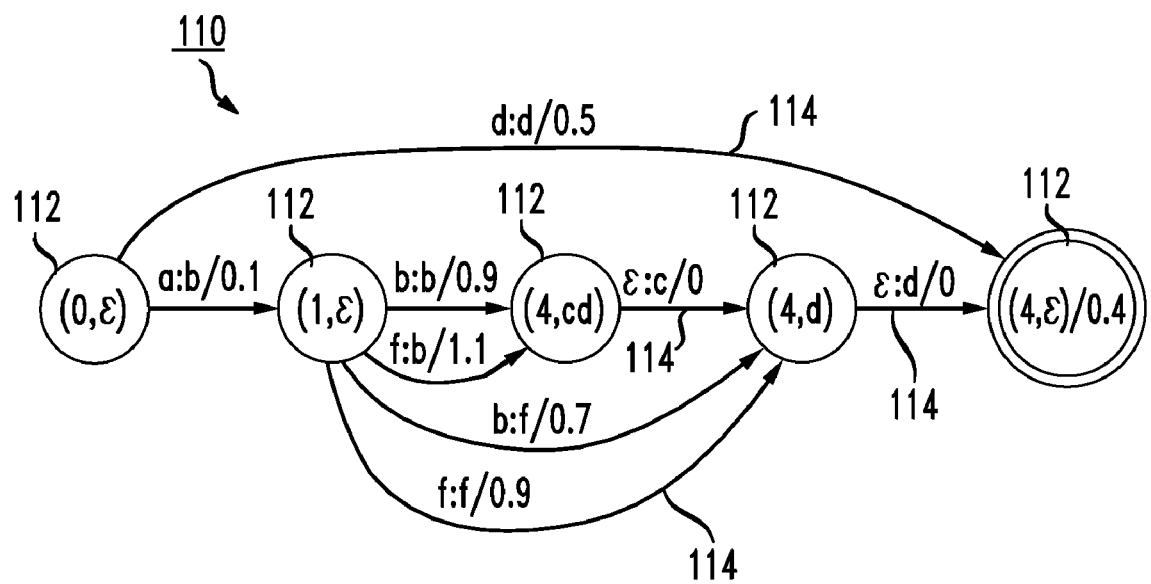

FIG. 9(b) illustrates this construction for the particular case of the transducer of FIG. 8(a). As in the case of ε-removal, input c-normalization admits a natural on-the-fly implementation since the outgoing transitions of state (p, y$_0$) 112 of the output automaton can be computed directly using only y$_0$ and the input ε-closure of q. The transducer 110 of FIG. 9(b) illustrates states 112 and transitions 114.

The method according to the first embodiment of the invention may be implemented in numerous ways. For example, high level programming languages such as Basic, C or other programming language may be used to implement the method. The best mode of implementation is a software implementation using a high-level programming language.

Figure 10:
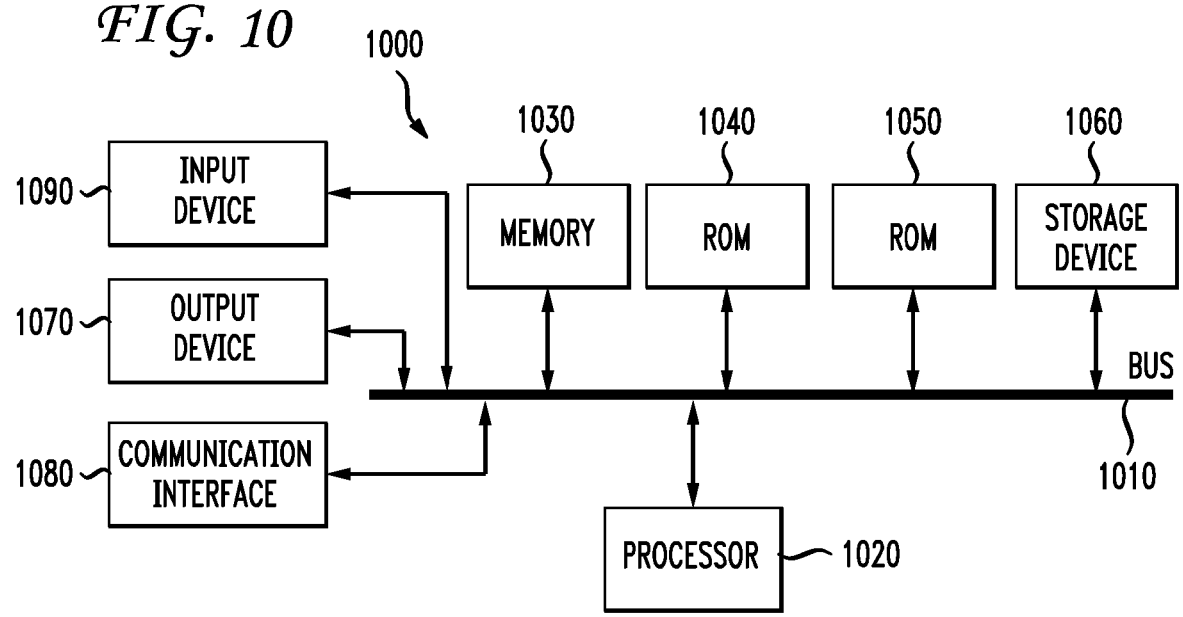
FIG. 10 illustrates a basic system configuration for an embodiment of the invention.

One example of a system or apparatus which illustrates a hardware implementation of the second embodiment of the invention is shown in FIG. 10. With reference to FIG. 10, an exemplary system for implementing this embodiment of the invention includes a general-purpose computing device 1000, including a processing unit (CPU) 1020 and a system bus 1010 that couples various system components including the system memory such as read only memory (ROM) 1040 and random access memory (RAM) 1050 to the processing unit 1020. Other system memory 1030 may be available for use as well. A basic input/output (BIOS), containing the basic routine that helps to transfer information between elements within the computing device 1000, such as during start-up, is typically stored in ROM 1040. The computing device 1000 further includes storage means such as a hard disk drive 1060, a magnetic disk drive, an optical disk drive, tape drive or the like. The storage device 1060 is connected to the system bus 1010 by a drive interface. The drives and the associated computer readable media provide nonvolatile storage of computer readable instructions, data structures, program modules and other data for the computing device 1000. The basic components are known to those of skill in the art and appropriate variations are contemplated depending on the type of device, such as whether the device is a small, handheld computing device, a desktop computer, or a computer server.

To enable user interaction with the computing device 1000, an input device 1090 represents an input mechanism for user input. The device output 1070 can also be one or more of a number of output means. The communications interface 1080 generally governs and manages the user input and system output.

Second Embodiment of the Invention

The second embodiment of the invention relates to a system or apparatus for ε-removal in automata. The system may comprise a variety of different forms. For example, a preferable aspect of the second embodiment of the invention is to provide a hardware implementation using electronic circuitry such as an EPROM, a programmable logic device (PLD) or a large group of logic gates. Some design tools such as SPLat (Simple Programmed Logic automation tool) boards have specifically been designed for implementation and programming of FSMs. Thus, circuit boards may be designed and created to carry out the functionality of the methods disclosed as part of the first embodiment of the invention. According to this embodiment of the invention, a hardware implementation such as a computer circuit, EPROM, or logic board is programmed to perform the steps set forth in the first embodiment of the invention. In this regard, the hardware, in whatever form, will receive an input weighted automaton A with ε-transitions. Upon the operation of the hardware component to the automaton A with ε-transitions, an equivalent weighted automaton B with no ε-transitions is created.

The process performed by the hardware comprises two main steps. The first step consists of computing for each state "p" of the input automaton A its ε-closure denoted by C[p]:

$$C[p] = \{(q,w): q \in \epsilon[p], d[p,q] = w \in K - \{\overline{0}\}\}$$

Where ε[p] represents a set of states reachable from "p" via a path labeled with ε. The second step consists of modifying the outgoing transitions of each state "p" by removing those labels with ε and by adding to be non-ε-transitions leading each state q with their weights pre-⊗-multiplied by d[p,q].

The second step in the method comprises modifying the outgoing transitions of each state "p" by removing those labeled with ε. The method adds to the set of transitions leaving the state "p" non-ε-transitions leaving each state "q" in the set of states reachable from "p" via a path labeled with ε with their weights pre-⊗-multiplied by the ε-distance from state "p" to state "q" in the automaton A. State "p" is a final state if some state "q" within the set of states reachable from "p" via a path labeled with ε is final and the final weight $$\rho[p] \text{ is } \rho[p] = \bigoplus_{q \in \epsilon[p] \cap F} (d[p,q] \otimes \rho[q]).$$

One aspect of the second embodiment of the invention relates to a computer readable medium such as a data disc or other medium having a program stored thereon that is operable to perform the method or process described with respect to the first embodiment of the invention. In this regard, executable code or source code may be stored on the computer readable medium. Those of ordinary skill in the art will understand and recognize how to create such a computer readable medium according to this embodiment of the invention given the understanding of the method according to the first embodiment of the invention. The computer readable medium may be, for example, a computer disk, hard disk, read-only-memory, or random access memory.

Third Embodiment of the Invention

The third embodiment of the invention relates to product produced by the process described above with respect to the method explained above. Specifically, the equivalent weighted automaton B with no ε-transitions is a product that is created by the process set forth and described above as the first embodiment of the invention. Therefore, the third embodiment of the invention relates to an automaton having no ε-transitions, the automaton being created according to the ε-removal algorithms described herein.

What follows is a series of equations related to process of Generic ε-Removal and Input ε-Normalization Algorithms for Weighted Transducers. We begin with a theorem and then the proof of the theorem. The following theorem and proof provide disclosure related to another aspect of the present invention.

Theorem 1 Let A=(Σ,Q,I,F,E,λ,ρ) be a weighted automaton over the semiring K right k-closed for A. Then the weighted automaton B result of the ε-removal algorithm just described is equivalent to A.

Proof. We show that the function defined by the weighted automaton A is not modified by the application of one step of the loop of the pseudocode above. Let A=(Σ,Q,I,F,E,λ,ρ) be the automaton just before the removal of the ε-transitions leaving state p∈Q.

Let χ∈Σ*, and let Q(p) denote the set of successful paths labeled with χ passing through p and either ending at p or following an ε-transition of p. By commutativity of ⊕, we have:

$$[A](\chi) = \bigoplus_{\pi \in P(\chi) - Q(p)} \lambda(p[\pi]) \otimes \omega[\pi] \otimes \rho(n[\pi]) \oplus \bigoplus_{\pi \in Q(p)} \lambda(p[\pi]) \otimes \omega[\pi] \otimes \rho(\eta[\pi])$$

Denoted by $S_1$ and $S_2$ are the first and second term of that sum. The $\epsilon$-removal at state p does not affect the paths not in Q(p), thus we can limit our attention to the second term $S_2$. A path in Q(p) can be factored in: $\pi = \pi_1, \pi_2, \pi_3$ where $\pi_\epsilon$, is a portion of the path from p to n $\pi_\epsilon = q$ labeled with $\in$. The distributivity of $\otimes$ over $\oplus$ gives us:

$$S_2 = \left( \bigoplus_{n[\pi_1]=p} \lambda(p[\pi_1]) \otimes \omega[\pi_1] \right) \otimes S_{22} \text{ with:}$$

$$S_{22} = \left( \bigoplus_{p[\pi_\epsilon]=p, n[\pi_\epsilon]=q} \omega[\pi_\epsilon] \right) \otimes \bigoplus_{p[\pi_2]=q} \omega[\pi_2] \otimes \rho(n[\pi_2])$$

$$= d[p, q] \otimes \bigoplus_{p[\pi_2]=q} \omega[\pi_2] \otimes \rho(n[\pi_2])$$

$$= \bigoplus_{p[\pi_2]=q} (d[p, q] \otimes \omega[\pi_2] \otimes \rho(n[\pi_2]))$$

For paths $\pi$ such that $\pi_2 = \in$:

$$S_{22} = \bigoplus_{p[\pi_2]=q, q \in \epsilon[p]} (d[p, q] \otimes \rho(q))$$

which is exactly the final weight associated to p by $\epsilon$-removal at p. Otherwise, by definition of $\pi_\epsilon$, $\pi_2$, does not start with an $\epsilon$-transition. The second term of the sum defining $S_{22}$ can thus be rewritten as:

$$S_{22} = \bigoplus_{e \in E[q], i[e] \neq \in, \pi_2 = e\pi_2'} (d[p, q] \otimes \omega[e]) \otimes \omega[\pi_2'] \otimes \rho(n[\pi_2])$$

The $\epsilon$-removal step at state p follows exactly that decomposition. It adds non $\epsilon$-transitions e leaving q with weights $(d[p,q] \otimes w[e])$ to the transitions leaving p. This ends the proof of the theorem.

Although the above description may contain specific details, they should not be construed as limiting the claims in any way. Other configurations of the described embodiments of the invention are part of the scope of this invention. For example, finite state machines may be used to design computer programs, logic circuits, or electronic control systems. The $\epsilon$-removal algorithm and other algorithms disclosed herein may clearly have application outside of speech processing. For example, the same algorithm (epsilon-removal) applies in contexts similar to speech such as text processing, information extraction, information retrieval, computational biology, etc. where weighted automata are used and where one wishes to make their use more efficient. Furthermore, the system and method disclosed here can be straightforwardly modified to remove transitions with a label a different from $\epsilon$. This can be done for example by replacing $\epsilon$ by a new label and a by $\epsilon$, applying $\epsilon$-removal and then restoring original $\epsilon$'s. Accordingly, the appended claims and their legal equivalents should only define the invention, rather than any specific examples given.

I claim:

1. A method of processing an automaton A, the method comprising:

computing via a processor of $\epsilon$-closure C of an automaton as follows:

$$C[p] = \{(q,w): q \in \epsilon[p], d[p,q] = w \in K - \{\overline{0}\}\}$$

where $\epsilon[p]$ represents a set of states reachable from "p" via a path labeled with $\epsilon$, d[p,g] represents an $\epsilon$-distance from p to q in the automaton A, K is a semiring, and w represents weights;

modifying outgoing transitions of each state "p" by:

removing each of the outgoing transitions labeled with an empty string; and adding to each of the outgoing transitions leaving ones of the set of states "p" a non-empty-string transition, wherein each of the set of states "q" is left with its weights pre-$\otimes$-multiplied by an $\epsilon$-distance from a corresponding one of the set of states "p" to a respective one of the set of states "q" in the automaton A; and applying the modified automaton A to process information in a field of at least one of: speech recognition, speech synthesis and text processing.

2. The method of claim 1, wherein in removing each of the outgoing transitions labeled with an empty string comply with the following pseudocode:

```
1   for each p ∈ Q
2     do E[p] ← (e ∈ E [p] : i[e] ≠ ε)
3     for each (q,w) ∈ C[p]
4       do E[p] ← E[p] U ((p,a,w ⊗ w',r) : (q, a, w', r) ∈ E[q], a ≠ ε)
5       if q ∈ F
6         then if p ∈ F
7           then F ← F U (p)
8             p[p] ← p[p] ⊕ (ω ⊕ p[q])
``` where E[p] represents outgoing transitions of each state p, Q is a finite set of states, and F is a finite set of states.

3. The method of claim 2, wherein states "p" is a final state if some state $q \in \epsilon[p]$ is final, and if so, then a final weight is:

$$\rho[p] = \bigoplus_{q \in \epsilon[p] \cap F} (d[p, q] \otimes \rho[q]).$$

4. A method of processing an automaton A, the method comprising:
  computing via a processor an ϵ-closure for each state "p" of the automaton A;
  modifying outgoing transitions of each state "p" by:
    removing each of the outgoing transitions labeled with an empty string; and
    adding to each of the outgoing transitions leaving ones of the set of states "p" a non-empty-string transition, wherein each of the set of states "q" is left with its weights pre-$\otimes$-multiplied by an ϵ-distance from a corresponding one of the set of states "p" to a respective one of the set of states "q" in the automaton A; and
  applying the modified automaton A to process information in a field of at least one of: speech recognition, speech synthesis and text processing.

5. The method of claim 4, further comprising:
  removing inaccessible ones of the states using a depth-first search of the automaton A.

6. The method of claim 4, wherein adding to each of the outgoing transitions leaving ones of the set of states "p" a non-empty-string transition, further comprises leaving each of the states "q" with weights (d[p,q]$\otimes$w[e]).

7. The method claim 4, wherein computing an ϵ-closure for each one of the set of states "p" of an input automaton A further comprises:
  removing all transitions not labeled with an empty string from the automaton A to produce an automaton $A_\epsilon$;
  decomposing $A_\epsilon$ into its strongly connected components; and
  computing all-pairs shortest distances in each component visited in reverse topological order.

8. A computer-readable medium storing instructions for controlling a computing device to process automaton A, the instructions comprising:
  computing of ϵ-closure C[p] of an automaton as follows:

$C[p]=\{(q,w): q \in \epsilon[p], d[p,q]=w \in K-\{\overline{0}\}\}$ where ϵ[p] represents the set of states reachable from "p" via a path labeled with ϵ, d[p,g] represents an ϵ-distance from p to q in the automaton A, K is a semiring, and w represents weights;
  modifying outgoing transitions of each state "p" by:
    removing each of the outgoing transitions labeled with an empty string; and
    adding to each of the outgoing transitions leaving ones of the set of states "p" a non-empty-string transition, wherein each of the set of states "q" is left with its weights pre-$\otimes$-multiplied by an ϵ-distance from a corresponding one of the set of states "p" to a respective one of the set of states "q" in the automaton A; and
  applying the modified automaton A to process information in a field of at least one of: speech recognition, speech synthesis and text processing.

9. The computer-readable medium of claim 8, wherein removing each of the outgoing transitions labeled with an empty string complies with the following pseudocode:

```
1    for each p ∈ Q
2        do E[p] ← {e ∈ E [p] : i[e] ≠ ϵ}
3        for each (q,w) ∈ C[p]
4            do E[p] ← E[p] ∪ {(p,a,w ⊗ w', r) :
                (q, a, w',r) ∈ E[q].a ≠ ϵ}
5            if q ∈ F
6                then if p ∉ F
7                    then F ← F ∪ {p}
8                    ρ[p] ← p[p] ⊕ (ω ⊕ ρ[q])
``` where E[p] represents outgoing transitions of each state p, Q is a finite set of states, and F is a finite set of states.

10. The computer-readable medium of claim 9, wherein state "p" is a final state if some state q∈ϵ[p] is final, and if so, then a final weight is:

$$\rho[p] = \bigoplus_{q \in \epsilon[p] \cap F} (d[p, q] \otimes \rho[q]).$$

* * * * *